US009045318B1

(12) United States Patent
Polus

(10) Patent No.: US 9,045,318 B1
(45) Date of Patent: Jun. 2, 2015

(54) SYSTEMS AND METHODS FOR CONTROLLING AN OVERHEAD GANTRY CRANE

(71) Applicant: The Boeing Company, Chicago, IL (US)

(72) Inventor: Jeffrey E. Polus, Hillsboro, IL (US)

(73) Assignee: The Boeing Company, Chicago, IL (US)

( * ) Notice: Subject to any disclaimer, the term of this patent is extended or adjusted under 35 U.S.C. 154(b) by 107 days.

(21) Appl. No.: 13/917,238

(22) Filed: Jun. 13, 2013

(51) Int. Cl.
*G06F 7/70* (2006.01)
*B66C 13/18* (2006.01)
*B66C 17/00* (2006.01)

(52) U.S. Cl.
CPC ................. *B66C 13/18* (2013.01); *B66C 17/00* (2013.01)

(58) Field of Classification Search
USPC ........................................................... 701/50
See application file for complete search history.

(56) References Cited

U.S. PATENT DOCUMENTS 2,829,582 A 4/1958 Abbott et al.
5,142,764 A 9/1992 Whiteside
5,199,147 A 4/1993 Whiteside
5,359,542 A * 10/1994 Pahmeier et al. ............. 701/301
6,349,441 B1 2/2002 Kosuch
2004/0006930 A1 * 1/2004 Fahrion ............................ 52/64
2007/0025832 A1 2/2007 Rawdon et al.
2007/0289931 A1 * 12/2007 Henriksson .................. 212/274
2008/0110844 A1 * 5/2008 Lewis et al. .................. 212/285
2009/0030647 A1 * 1/2009 Stocker ......................... 702/152
2009/0164345 A1 * 6/2009 Pierce et al. .................... 705/29
2010/0145526 A1 * 6/2010 Yamaguchi et al. .......... 700/275
2010/0181165 A1 * 7/2010 Finn .......................... 198/339.1
2011/0076130 A1 * 3/2011 Stocker et al. ................ 414/815
2012/0036700 A1 2/2012 Mun
2012/0101694 A1 * 4/2012 Morath et al. .................. 701/50
2012/0128113 A1 * 5/2012 Park et al. ..................... 376/264
2013/0013144 A1 * 1/2013 Tanizumi et al. ............ 701/34.4
2014/0232208 A1 * 8/2014 Yamaguchi et al. .......... 307/154

* cited by examiner

*Primary Examiner* — Hussein A. Elchanti
(74) *Attorney, Agent, or Firm* — Joseph M. Butscher; The Small Patent Law Group, LLC

(57) ABSTRACT

Systems and methods for controlling an overhead gantry crane are provided. One overhead gantry crane includes an X-axis drive motor, a Y-axis drive motor, and a hoist member operable to be moved into a plurality of positions by the X-axis drive motor and the Y-axis drive motor to move an object. The overhead gantry crane further includes a controller operable to control operation of the X-axis motor and the Y-axis motor and define a local axis coordinate system for the overhead gantry crane based on a reference point determined from an X-axis location and Y-axis location of the hoist member and a desired movement path for the object, as well as cause movement of the object by concurrently controlling the X-axis motor and the Y-axis motor using the local axis coordinate system.

18 Claims, 8 Drawing Sheets

SYSTEMS AND METHODS FOR CONTROLLING AN OVERHEAD GANTRY CRANE

BACKGROUND

The present disclosure relates generally to control systems, such as systems and methods for controlling an overhead gantry crane, for example, an overhead gantry crane in an aircraft hangar.

Moving and positioning objects on a shop floor, such as within an aircraft hangar may include placing the object in an orientation that is not aligned with the main axes (e.g., X-axis and/or Y-axis) of the crane system. For example, in an aircraft hangar, it may be desirable to move an aircraft, or part of the aircraft, such as an aircraft wing, in directions that are not parallel to the main axes of the crane. As a result, a complex set of non-linear step movements (e.g., incremental choppy steps movements) are performed in order to move the object in any direction other than parallel to the major axis. This process of controlling the movement in non-linear steps is not only time consuming, but also may be dangerous for the shop floor personnel, as well as the object being moved. For example, collisions with other objects within the hangar may result because of a difficulty in recognizing the proper movements relative to the off main axis orientation of the object being moved.

SUMMARY

In accordance with one embodiment, an overhead gantry crane is provided that includes an X-axis drive motor, a Y-axis drive motor, and a hoist member operable to be moved into a plurality of positions by the X-axis drive motor and the Y-axis drive motor to move an object. The overhead gantry crane further includes a controller operable to control operation of the X-axis motor and the Y-axis motor and define a local axis coordinate system for the overhead gantry crane based on a reference point determined from an X-axis location and Y-axis location of the hoist member and a desired movement path for the object, as well as cause movement of the object by concurrently controlling the X-axis motor and the Y-axis motor using the local axis coordinate system.

In accordance with another embodiment, a method for moving an object using an overhead gantry crane is provided. The method includes storing in a memory, as a reference point, a position of a hoist member of the overhead gantry crane moved for attachment to the object to be moved using X-axis and Y-axis drive motors. The method further includes defining a local axis coordinate system for the overhead gantry crane for a controller to control the movement of the object based on the reference point and a desired movement path for the object. The method also includes using the defined local axis coordinate system to control movement of the object along the desired movement path by concurrently controlling with the controller the X-axis and Y-axis drive motors.

The features and functions discussed herein can be achieved independently in various embodiments or may be combined in yet other embodiments, further details of which can be seen with reference to the following description and drawings.

DETAILED DESCRIPTION

Figure 1:
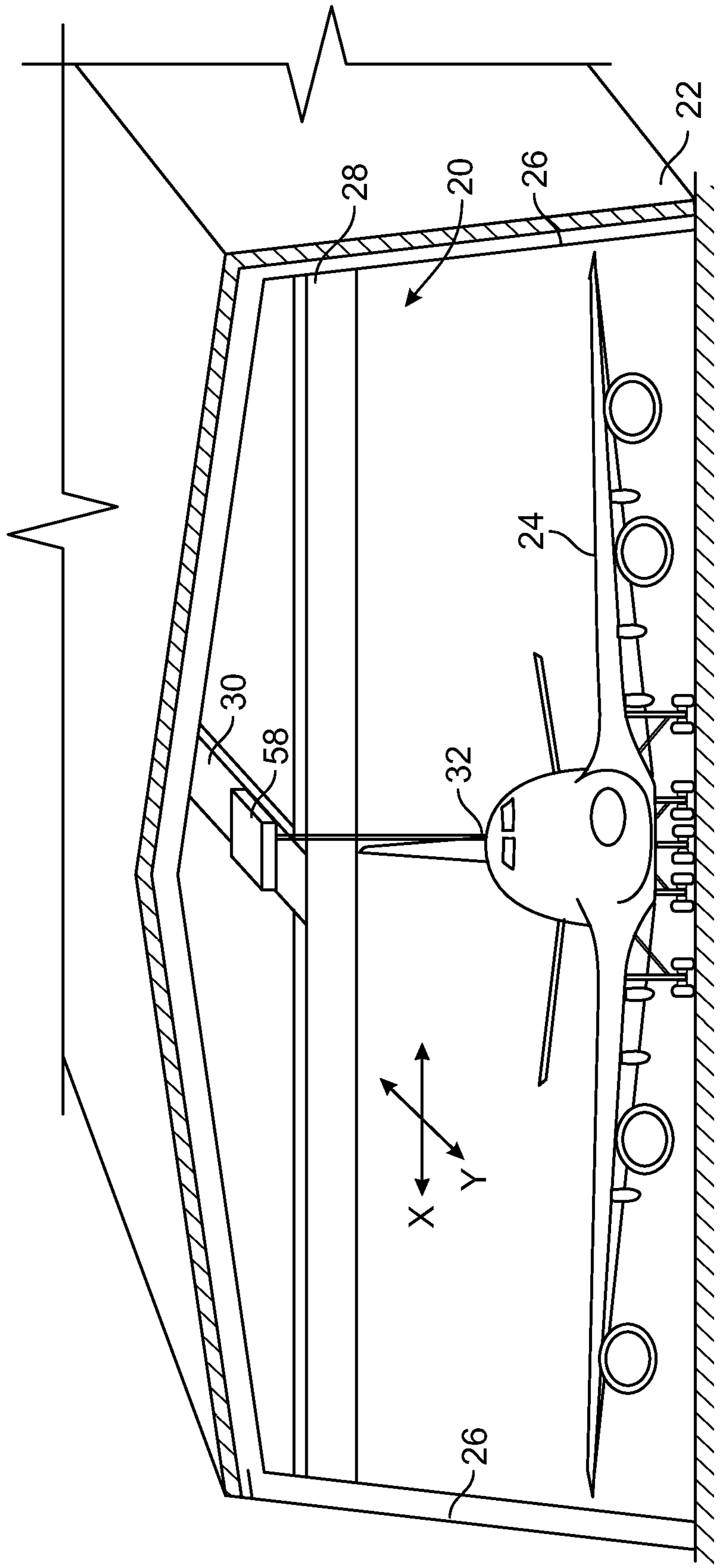
FIG. 1 is an illustration of an aircraft within a hangar that may be moved by an overhead crane in accordance with various embodiments.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments described and/or illustrated herein provide systems and methods for moving objects, such as within a large building or facility, for example, in an aircraft hangar. In some embodiments, the object is an aircraft or a portion thereof, such as a wing of the aircraft. However, various embodiments may be used to move objects in other structures, as well as in non-aircraft applications. Thus, while various embodiments may be described in connection with a particular application, such as an aircraft application, the various embodiments may be used in different applications, such as for objects for land, air, sea and pressurized space applications, as well as non-transport or non-mobile platform applications. Additionally, the various embodiments may be used outside of a structure where space constraints exist.

In general, various embodiments provide a hoist member for a gantry crane that is controlled and moved into position for attachment to an object to be moved using a plurality of discrete motors, for example, main axis motors that move in orthogonal directions relative to each other. For example, in various embodiments, the axes are identified as the X-axis and Y-axis. In general, as used herein in various embodiments, a gantry crane refers to a crane that lifts objects by a hoist that is fitted, for example, in a hoist trolley and can move horizontally on a rail or pair of rails fitted under a beam. For example, an overhead travelling crane, also known as an overhead crane or as a suspended crane, has the ends of the supporting beam, namely the gantry, resting on wheels moving along rails above the object to be moved, such as on parallel side walls of a hangar, factory or similar large industrial building, such that the whole crane is able to move the length of the building, while the hoist can be moved back and forth across the width of the building. In some embodiments, the gantry crane (or portal crane) has a similar mechanism supported by uprights, usually with wheels at the foot of the uprights allowing the entire crane to traverse within the building. Some portal cranes may have only a fixed gantry, such as when lifting loads including railway cargo that is already easily moved thereunder.

The gantry crane in various embodiments includes a controller for the motors that is controlled or commanded (e.g., instructed based on user inputs) to move an object with an initial X-axis and Y-axis location used as a reference point, and a local axis coordinate system for the gantry crane defined within the controller based on the reference point and a desired movement path for the object as described in more detail herein. Thereafter, the object is moved along a movement path by controlling, for example, an X-axis drive motor and a Y-axis drive motor, independently, which may include simultaneous or concurrent control of movement based on and using the local axis coordinate system defined within the controller.

With reference particularly to FIG. 1, a gantry crane 20 is illustrated within an aircraft hangar 22. The gantry crane 20 allows for positioning and moving of an object, illustrated as an aircraft 24, within the hangar 22. As should be appreciated, because of the dimensions of the hangar 22, and the size of the object, the object may have to be positioned in a non-parallel manner to the walls 26 of the hangar 22, and thus non-parallel to the major axis of the hangar 22 and the gantry crane 20 (as illustrated in FIG. 1, the aircraft 24 is offset sideways within the hangar 22). For example, the X-axis and Y-axis are perpendicular or orthogonal axis defined in the illustrated embodiment as from front to back of the hangar 22 and side to side of the hangar 22 (between the walls 26), respectively.

Various embodiments facilitate movement of the aircraft 24 that is oriented in or to be moved along a non-parallel orientation within the hangar 22, such as non-parallel to the major axes of the gantry crane 20. For example, a current X and Y location of the aircraft 24 is used as a reference point to define a local coordinate axis for the gantry crane 20 for the controller based on the reference point and a desired movement path for the aircraft 24, which is then used to move the aircraft 24 along the movement path by controlling a plurality of motors using the local axis coordinate system.

Figure 2:
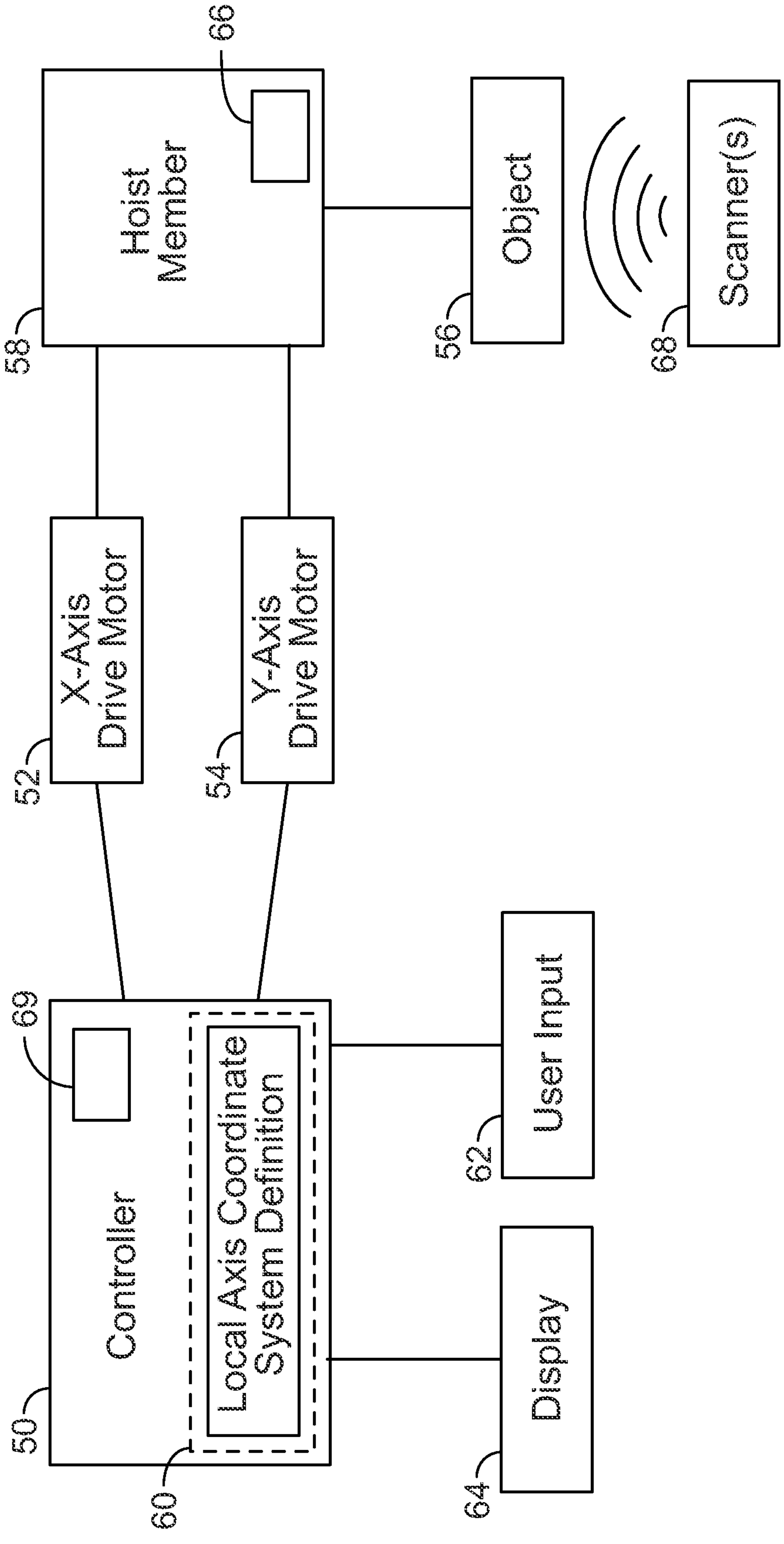
FIG. 2 is a block diagram illustration of a controller arrangement in accordance with an embodiment.

For example, as shown in FIG. 2 a controller 50 may be provided that uses a local axis coordinate system definition to control an X-axis drive motor 52 and a Y-axis drive motor 54. In one embodiment, the X-axis drive motor 52 and the Y-axis drive motor 54 may be used to control movement of an object 56 by moving a hoist member 58 along a desired movement path based on the local axis coordinate system definition to facilitate movement of the object when non-parallel to the major axes of the gantry crane 20 (shown in FIG. 1). The controller 50 may be implemented in hardware, software, or a combination thereof. For example, the controller 50 may be implemented as part of an existing control system for the gantry crane 20. The controller 50 may be a module or a plurality of modules or sub-modules that are configured as a processing module. For example, the controller 50 may be configured as one or more computer processors or other logic-based devices that perform operations based on one or more sets of instructions (e.g., software), which may be determined in various embodiments using the local axis coordinate system definition. The instructions on which the controller 50 operates may be stored on a tangible and non-transitory (e.g., not a transient signal) computer readable storage medium, such as a memory 60. The memory 60 may include one or more computer hard drives, flash drives, RAM, ROM, EEPROM, and the like. Alternatively, one or more of the sets of instructions that direct operations of controller 50 may be hard-wired into logic of a system controller (not shown), such as by being hard-wired logic formed in the hardware thereof.

Additionally, a user input 62 may be provided. For example, the user input 62 may be a hand held device, such that the controller 50 may be embodied as a hand held controller for receiving user inputs. For example, the hand held controller may include input members, such as buttons, knobs, or joysticks, and the like, to control the movement of the gantry crane 20 based on the defined local axis coordinate system. The hand held controller also may provide a visual warning or notification used by the operator to control the movement of the gantry crane 20. For example, the visual notification may illustrate or display the local axis coordinate system. Additionally, a display 64 may be provided for displaying information to facilitate controlling movement of the gantry crane 20 as described in more detail herein. The display 64 may be a separate device or provided as part of the hand held controller or on the gantry crane 20.

The use of the local axis coordinate system definition (that defines a custom coordinate system different than a normal coordinate system as described herein) facilitates movement of the object 56 when oriented non-parallel to the major axes of the hoist member 58, such as non-parallel within the hangar 22 (shown in FIG. 1). It should be noted that the X-axis drive motor 52 and a Y-axis drive motor 54 are independently controlled, but in various embodiments operate in unison or concurrently to provide coordinated movement along a desired movement path to move the object 56 that is in a non-parallel orientation as described herein. It also should be noted that multiple local axis coordinate systems may be stored within the memory 60 and used or switched between as desired or needed.

Thus, because an aircraft 24 may be positioned in an offset orientation or turned within the hangar 22, such that the longitudinal axis (from nose to tail) of the aircraft 24 is not parallel to the walls 26, for example because of the size of the aircraft 24 (e.g., long wingspan), various embodiments utilize the X and Y location of the non-parallel oriented aircraft 24 as a reference point, and define a local coordinate system for the gantry crane 20 based on the reference point and a desired movement path for the aircraft 24. For example, the X and Y position of the non-parallel oriented aircraft 24 is used to define an origin of a local X, Y, Z coordinate system within the hangar 22 with respect to which the hangar crane 20 may be moved.

With reference again to FIG. 1, the Y-axis of the hangar coordinate system runs along the building centerline and as can be seen, the longitudinal axis of the aircraft 24 is positioned or parked offset from this Y-axis. The X-axis of the hangar coordinate system is in a horizontal plane with the Y-axis, with the X-axis line running perpendicular to the Y-axis. Additionally, the origin of the hangar coordinate system in one embodiment is on the floor of the hangar 22, and therefore the zero position of the Z axis is at the floor of the hangar 22 and increases in a positive direction upwardly toward the ceiling of the hangar 22.

With the aircraft 24 positioned or parked within the hangar 22, various embodiments determine an offset position of the aircraft 24 relative to the absolute hangar coordinate axis, which is the same as the coordinate axis of the gantry crane 20, in particular, the support beams 28 (one is shown in FIG. 1) that are parallel to the X-axis of the hangar coordinate system and the support beam 30 (e.g., cross-beam or gantry)

that is parallel to the Y-axis of the of the hangar coordinate system and perpendicular to the X-axis. Thus, in this embodiment, the support beams 28 extend between the walls 26 of the hangar 22 with the support beam 30 coupled between and to the support beams 28. The support beam 30 may move along the support beams 28 to provide X-axis movement of the aircraft 24 and the hoist member 58 moves along the support beam 30 to provide Y-axis movement of the aircraft 24.

In various embodiments, X-axis drive motors 52 (one is shown in FIG. 2) may be coupled to each of the ends of the support beam 30 at each of the support beams 28 and a single Y-axis drive motor 54 (shown in FIG. 2) coupled to the support beam 30 at the hoist member 58. It should be noted that the X-axis drive motor 52, the Y-axis drive motor 54 and the hoist member 58 may be any suitable devices capable of moving, for example, the aircraft 24, or a part of the aircraft 24 (e.g., a separate wing) within the hangar 22. The X-axis drive motor(s) 52 and the Y-axis drive motor 54 in some embodiments are configured to drive a plurality of wheels (not shown) along a respective beam 28 or 30, which may include a rail, channel or other guide member for the wheels. Additionally, the hoist member 58 may be configured to rotate such that an attachment member 32 may be aligned with the longitudinal axis of the aircraft 24 that is offset from the X-axis and Y-axis of the hangar 22 and the gantry crane 20.

In one embodiment, the hoist member 58 includes an encoder 66 (as shown in FIG. 2), or other similar location determination device (e.g., GPS device), that allows for determining the location of the hoist member 58, and thus an origin or reference point for the offset position of the aircraft 24. In some embodiments, as described in more detail herein, the hoist member 58 may be moved to the desired X-axis and Y-axis directions from a reference point (e.g., maximum movement in each direction), such that each of the positions is recorded and stored to define the local axis coordinate system as described herein.

Thus, with respect to determining the position of the aircraft 24 within the hangar 22, this location may be ascertained by moving the hoist member 58 to the location of the aircraft 24 and using that X-axis and Y-axis location determined from movement of the X-axis drive motor 52 and Y-axis drive motor 54 (which similarly may include location determination devices of encoders) to desired locations, along with location information from the encoder 66 of the hoist member 58. The controller 50 (shown in FIG. 2) uses this X-axis location and Y-axis location as the reference point, which along with determined offset axes then defines the local axis coordinate system for the gantry crane 20 to move an object, such as the aircraft 24, along a desired movement path. For example, using the defined local axis coordinate, when a user controls the X-axis drive motor 52 and/or Y-axis drive motor 54, the movement may be controlled based on the major axes of the aircraft 24, in particular the longitudinal and wing span axes that define a different X-axis and Y-axis, respectively, when the aircraft 24 is in the offset position. Accordingly, in various embodiments, the local axis coordinate system defines a coordinate system in which one of the two axes is parallel to an axis (e.g., recognizable axis) of the object, such the longitudinal axis from nose to tail of the aircraft 24. This arrangement facilitates a more intuitive and easier control of the movement of the aircraft 24 along newly defined coordinate axes. For example, as described in more detail herein, the local axes defined by the local axis coordinate system may be displayed to a user with respect to the X-axis and Y-axis of the gantry crane 20. Thus, a user is able to clearly identify the local axes, which allows for easier control, with the controller 50 making the adjustment (e.g., shifts) to maintain the moving aircraft 24 or other object along the local axes.

It should be noted that in other various embodiments, a user may enter the aircraft type and model with a profile in three dimensions as part of the initial reference point determination as different aircraft are differently shaped and sized, etc. This information may be used to determine the range of the position of aircraft, which may be used for collision avoidance, such as to set limits on the motion of the gantry crane 20.

It also should be noted that in some embodiments, instead of or in addition to using encoder position information or movement of the X-axis drive motor 52 and/or Y-axis drive motor 54 to define the offset axes, a scanning process may be performed to determine the X, Y offset position of the aircraft relative to the origin of the hangar coordinate system. For example, one or more scanners 68 (e.g., laser scanners), as shown in FIG. 2, may be used as known in the art for determining the X, Y offset position of the airplane relative to the hangar coordinate system. The scanners 68 may be positioned over the leading edges of the wings of the aircraft 24 and may be suspended on rails (not shown) positioned above and along each wing. In operation, the X, Y positions of the scanner heads within the hangar coordinate system are sent to the controller 50 by an encoding or position determining means, such as a linear displacement transducer, for each scanner head. In one embodiment, the scanners 68 are positioned above the wings such that scanning beams pass the leading edge of the wings and reflect off a removable scanner target, placed below the wings, and back to the scanners 68. The scanning beam from each scanner is reflected from the removable scanner target while the scanner is moved until the reflection of the scanning beam is interrupted by the wing. Thus, the position of each scanner 68 at the point where the reflection is no longer reflected back to the scanner head is sent as positional data to the controller, for example, a processor 69 of the controller 50.

In some embodiments, the X, Y coordinate positions relative to the hangar coordinate system of the scanner heads 68 at the points where the scanner beams intersect the leading edges of the wings may be used to determine a pair of lines, one line along each leading edge, which intersect at a point having X, Y values that lie on the longitudinal axis of the aircraft 24 and that are readily ascertainable relative to the hangar coordinate system. However, it should be appreciated that any suitable method may be used to determine the reference point location, which may or may not include the location of the entire aircraft 24, but simply the location of the aircraft 24 at the point connected to the hoist member 58 to determine the offset orientation (e.g., rotation from the hangar coordinate system). For example, as described herein, using the known location of the X-axis drive motor 52, Y-axis drive motor 54, and/or the hoist member 58 (including a rotational position thereof), an offset value from the hangar coordinate system may be determined.

Figure 4:
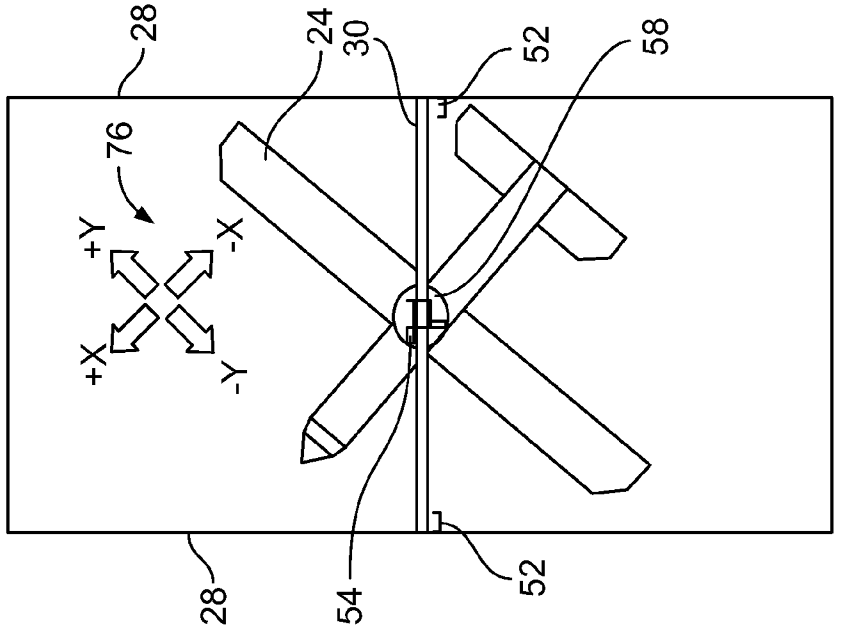
FIG. 4 is a diagram illustrating custom coordinate axes in accordance with an embodiment.
Figure 3:
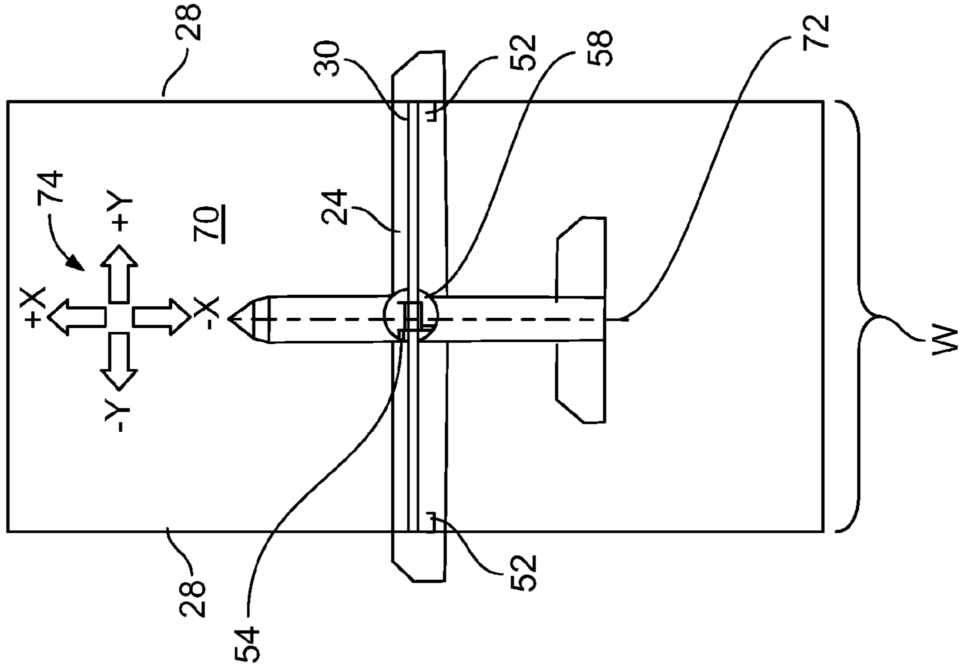
FIG. 3 is a diagram illustrating gantry crane coordinate axes in accordance with an embodiment.

Accordingly, various embodiments use a custom defined axis coordinate system, such as the local axis coordinate system as described herein to redefine the axes corresponding to movement of an object, such as the aircraft 24. For example, the aircraft 24 may be too wide to fit within a defined space, such as the hangar 22. FIG. 3 illustrates that the aircraft 24 may be two wide to fit within the hangar 22 (the hangar floor 70 is shown in FIG. 3), such as within the footprint of the hangar 22. In the illustrated example, the wingspan of the aircraft 24 does not allow the aircraft 24 to be positioned in alignment with the hangar coordinate system, namely the X-axis and Y-axis of the hangar 22, such that the longitudinal axis 72 of the aircraft 24 is aligned with the supports beams 28 or the support beam 30 (e.g., the wingspan is longer than the width (W) of the hangar 22). Accordingly, as shown in FIG. 4, the aircraft 24 is positioned within the hangar 22 in an offset orientation or position with respect to the hangar coordinate system. The offset position of the aircraft 24 allows for the entire aircraft 24 to be located within the hangar 22 and on the hangar floor 70, which may be a shop floor in various embodiments. In various embodiments, the axis of the gantry crane 20 is reoriented to align with the aircraft 24, such that the X-axis, in this embodiment, is aligned and parallel with the longitudinal axis 72 of the aircraft. The shifting or reorienting of the axes is illustrated by the hangar coordinate system axes 74 shown in FIG. 3, which is rotated to the local axis coordinate system 76 shown in FIG. 4.

Figure 5:
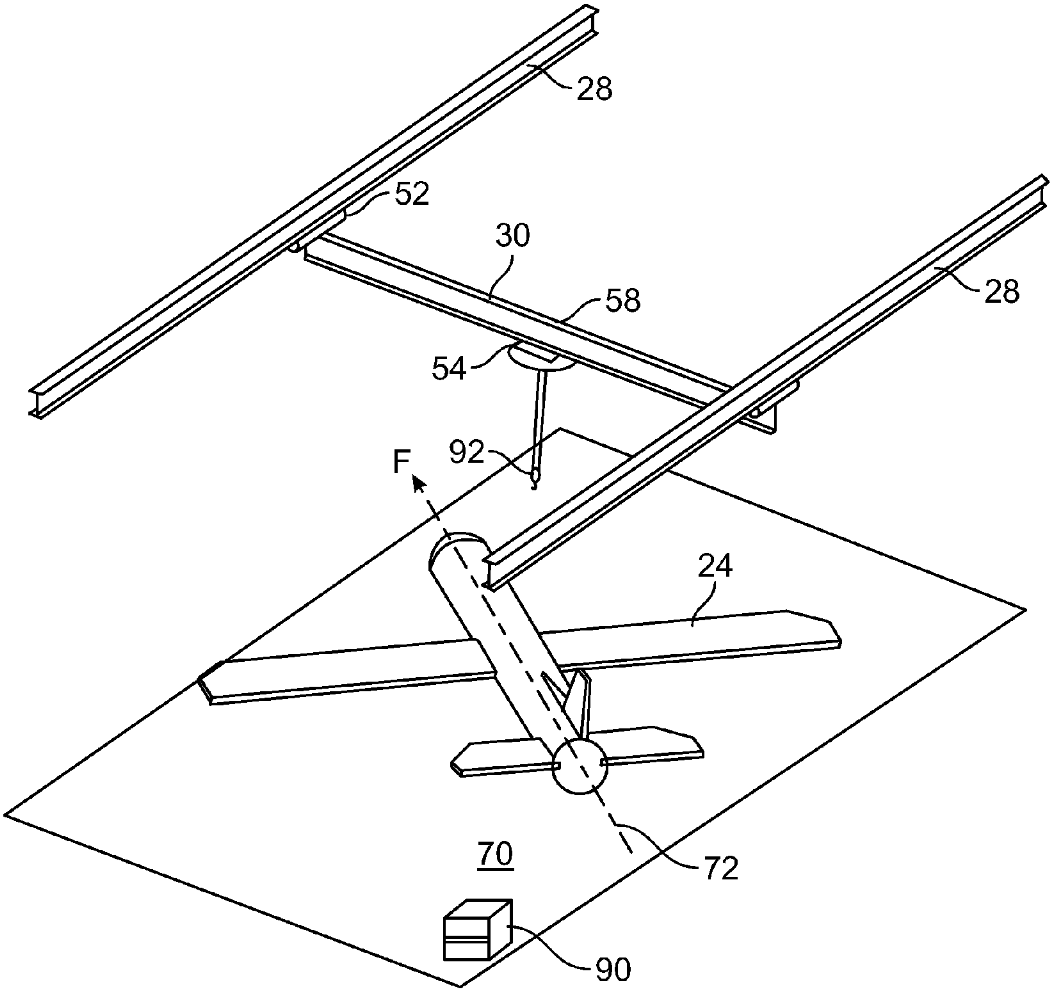
FIG. 5 is a diagram of an offset aircraft to be moved with a gantry crane in accordance with an embodiment.

Thus, when an operator controls the movement of the aircraft 24 within the hangar 22, the movements of the X-axis drive motor 52 and Y-axis drive motor 54 are provided based on the local axis coordinate system. For example, if a user desires to move the aircraft 24 forward (the F direction as illustrated in FIG. 5), the user may provide inputs at a control panel 90 (which may be embodied as the user input 62 shown in FIG. 2) that are used by the controller 50 (shown in FIG. 2) to translate the movements using the local axis coordinate system definition such that the X-axis drive motor 52 and Y-axis drive motor 54 are controlled to move the aircraft in the +X direction in the local axis coordinate system 76 instead of the +X direction in hangar coordinate system. For example, when a user desires to move the aircraft 24 forward, a user may move a joystick of the control panel 90 in a forward direction, which in this embodiment corresponds to the custom+X direction defined by the local axis coordinate system 76 (shown in FIG. 4). The X-axis drive motor(s) 52 and Y-axis drive motor 54 are then controlled in unison (e.g., coordinated movements) to move the aircraft 24 along the desired movement path, which in this example is forward. It should be noted that the hook portion 92 of the hoist member 58 is shown unattached in FIG. 5, but is attached when the aircraft 24 is moved.

Figure 6:
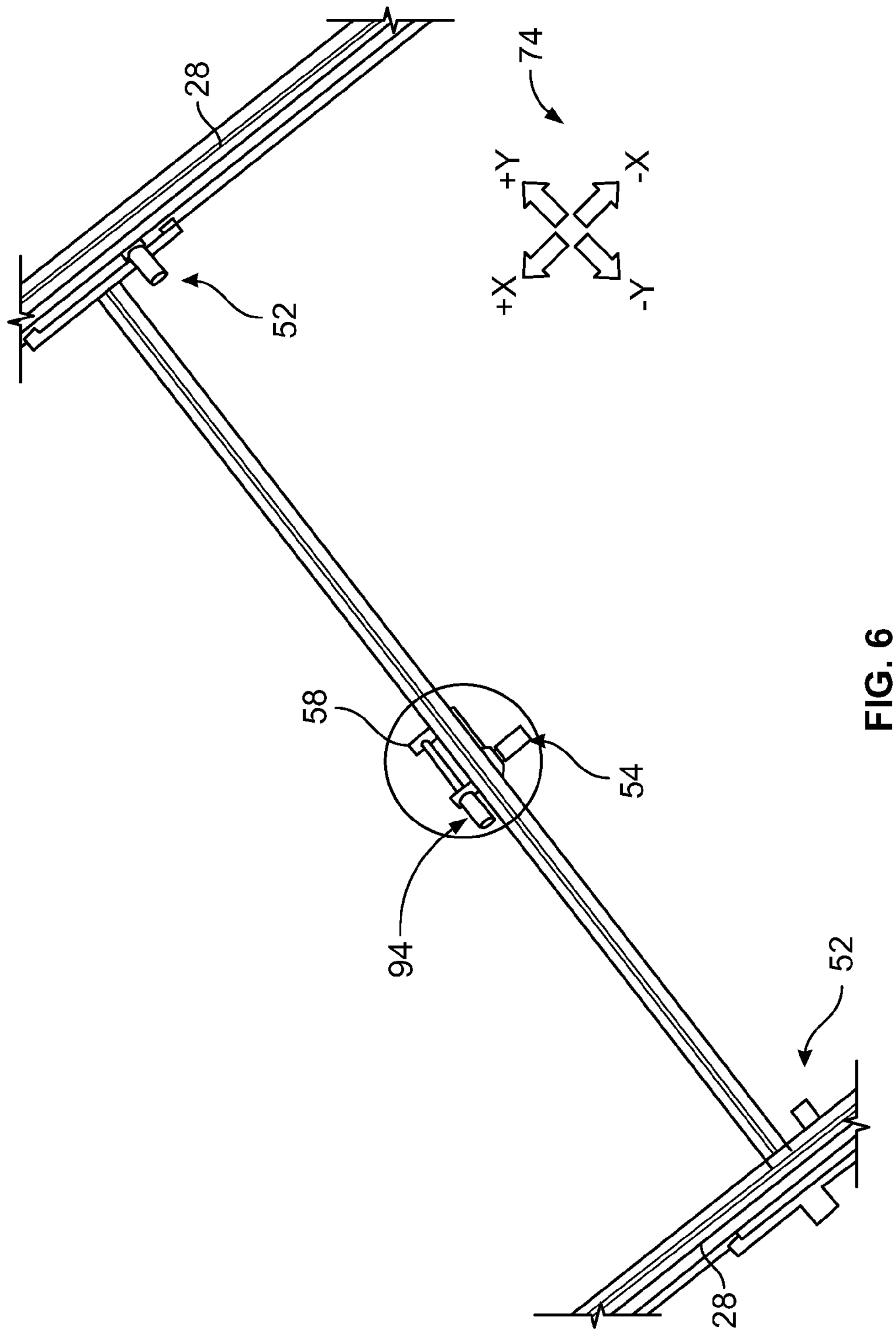
FIG. 6 is a diagram illustrating drive motors in accordance with an embodiment.

FIG. 6 illustrates the motors used in the coordinated movement of the aircraft 24. In particular, the X-axis drive motors 52 and the Y-axis drive motor 54 are controlled in coordination to move the aircraft 24 along the local axis coordinate system. However, instead of the X-axis drive motors 52 and the Y-axis drive motor 54 controlling movement in the +/−X-direction and +/−Y-direction of the hangar coordinate system 74, illustrated as parallel to the beams 28 and 30, respectively, the X-axis drive motors 52 and the Y-axis drive motor 54 are controlled to together move the aircraft 24 in a custom direction as defined by the local axis coordinate system 76 (shown in FIG. 4). For example, the X-axis drive motors 52 and the Y-axis drive motor 54 may move together to move the aircraft in a diagonal direction with respect to the hangar coordinate system 74, such that the movement is offset from the major axes of the hangar coordinate system 74, but aligned with or based on the +/−X-direction and +/−Y-direction of the local axis coordinate system 76. For example, by controlling movement in unison or in a coordinated manner, the aircraft 24 is moved non-parallel to the beams 28 and/or 30 along the new or custom axes as defined by the local axis coordinate system 76.

It should be noted that a Z-axis motor 94 also may be provided in connection with the hoist member 58. For example, the Z-axis motor 94 allows movement of the aircraft 24 in the upwards and downwards directions (+/−Z-directions) to lift and lower the aircraft 24 from the hangar floor 70.

Figure 7:
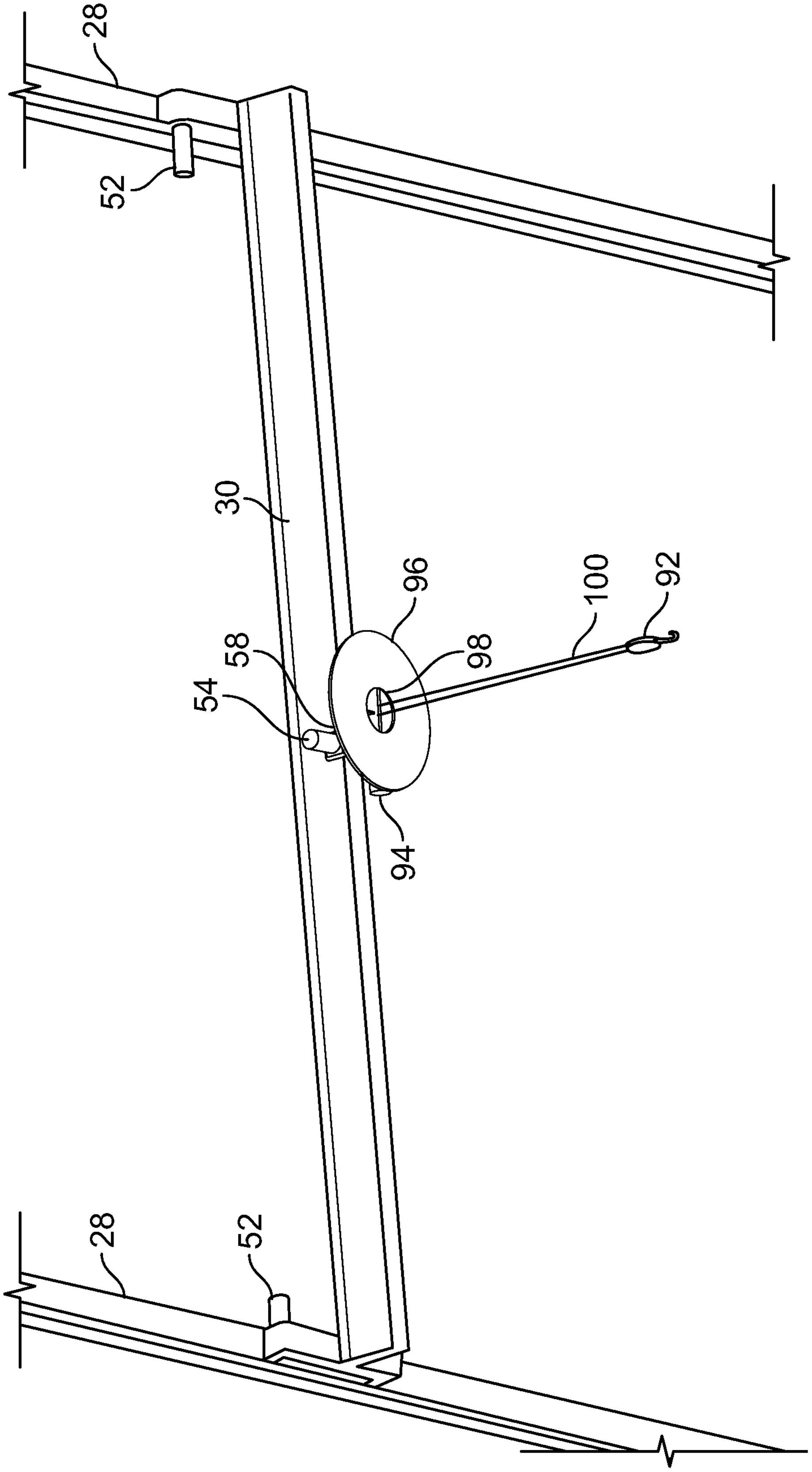
FIG. 7 is a diagram illustrating a hoist member in accordance with an embodiment.
Figure 8:
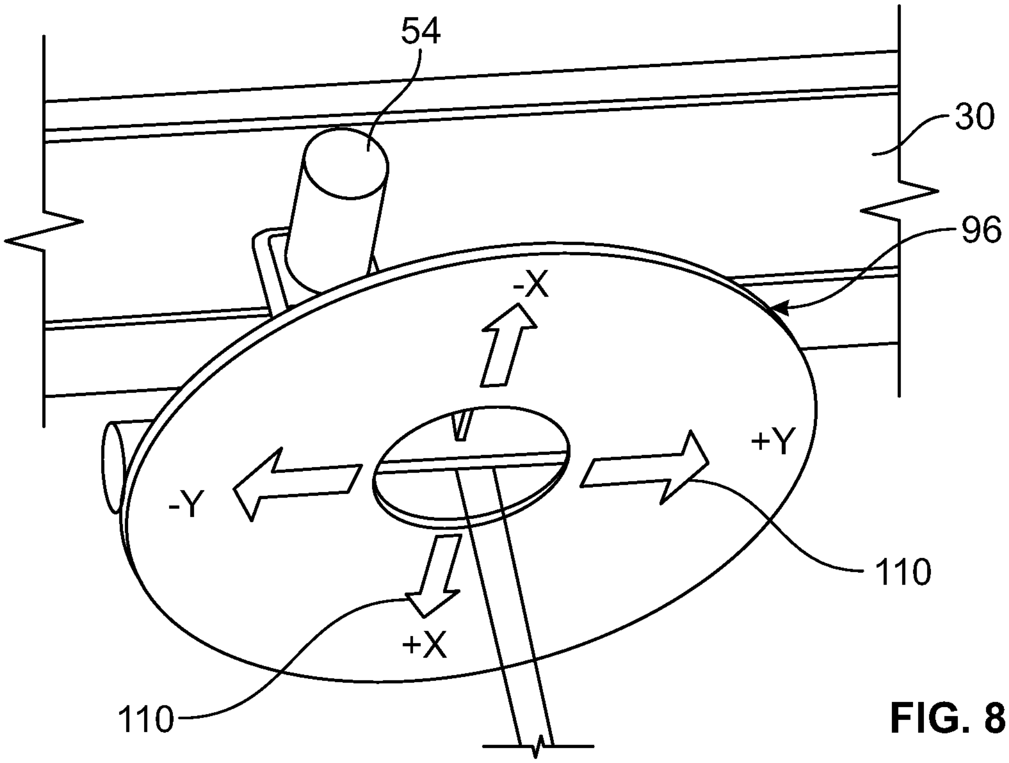
FIG. 8 is a diagram illustrating a display board in accordance with an embodiment.
Figure 9:
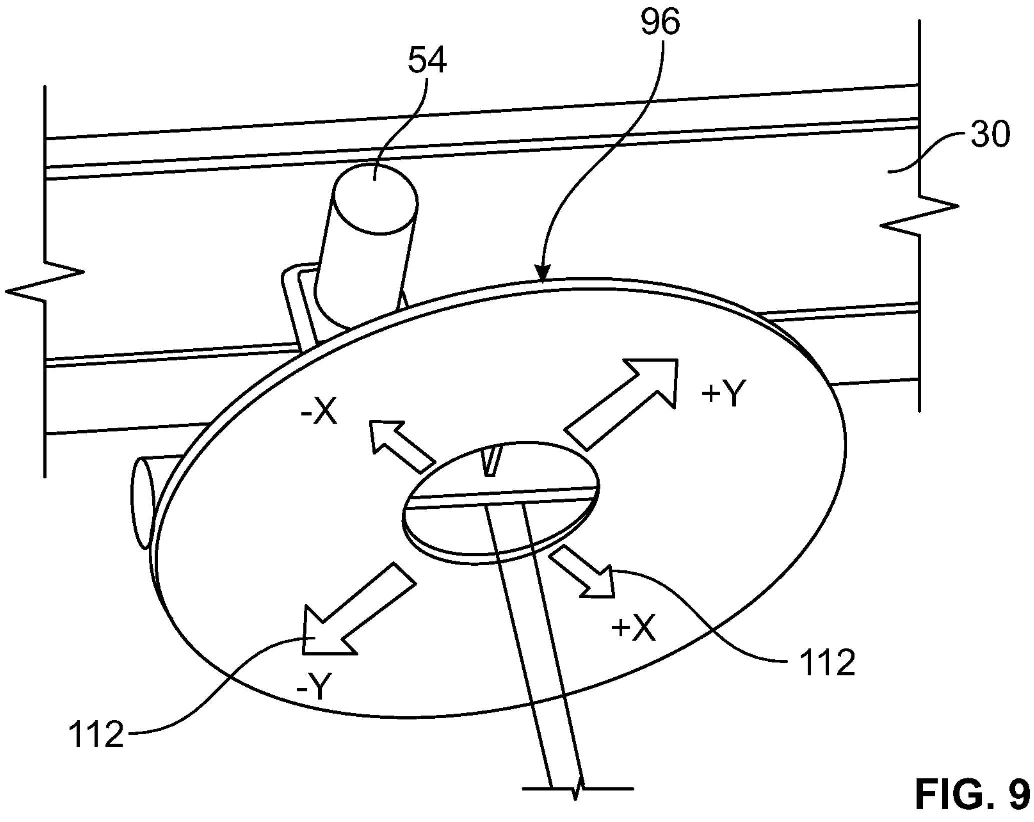
FIG. 9 is another diagram of a display board in accordance with an embodiment.

In various embodiments, a visual indication of movement information and/or aircraft information may be provided. For example, is some embodiments, the control panel 90 may include the display 64, shown in FIG. 2 to display information, such as the local axis coordinate system 76, which may be displayed with respect to the hangar coordinate system or other normal axis coordinate system. In some embodiments, a display member, illustrated as a display board 96 is positioned on a bottom surface of the hoist member 58, for example, under the Y-axis drive motor 54 as illustrated in FIG. 7. The display board 96 may be any shape or size and is illustrated as circular with an opening 98 for one of more cables 100 to pass therethrough from the hoist member 58. In one embodiment, the display board 96 is a light emitting diode (LED) display board to display the local axis coordinate system, such as showing the current +/−X-directions and +/−Y-directions to a user. Accordingly, when viewing the display board 96, a user is able to determine which direction is currently, for example, forward (+X) in the local axis coordinate system, and that is offset from the hangar coordinate system. Thus, a user can determine which direction the aircraft will move corresponding to +/−X-directions and +/−Y-directions of the controls. For example, FIG. 8 illustrates the display board 96 displaying identifiers 110 of direction, shown as arrows corresponding to the +/−X-directions and +/−Y-directions with identification of the axes. As can be seen, in this embodiment, the identifiers 110 show the hangar coordinate system as the +/−Y-direction is aligned with the beam 30. However, when a custom coordinate system is defined, such as to move an offset aircraft 24 as described herein, a new set of identifiers 112 are displayed by the display board 96. The identifiers 110 show the local axis coordinate system as the +/−Y-direction is no longer aligned with the beam 30. Thus, custom coordinate axes may be defined.

It should be noted that the display board 96 may be any type of display member that allows for displaying information, such as to facilitate identification of the current axes of movement for an object, such as the aircraft 24.

Thus, for example, some objects worked on in a shop, such as the aircraft 24 in the hangar 22 cannot be positioned in parallel with the X and Y axes of the overhead gantry crane 20, which are aligned with the hangar coordinate system in an aircraft application. Conventionally, moving such objects, such as the aircraft 24 or a wing of the aircraft 24 in directions that are non-parallel to the axes of the gantry crane 20 use a complex set of "non-linear" choppy step moves in order to move the object in such direction, for example, any direction other than parallel to a major axis. In various embodiments, the axis of the gantry crane 20 is re-oriented to be parallel to the object. For example, a controller, such as the controller 50 (shown in FIG. 2) can be custom programmed to create new axes in which the gantry crane 20 will move via the use of the X-axis and Y-axis drive motors 52, 54 working in conjunction with one another to produce a new vector for the desired axis.

Figure 10:
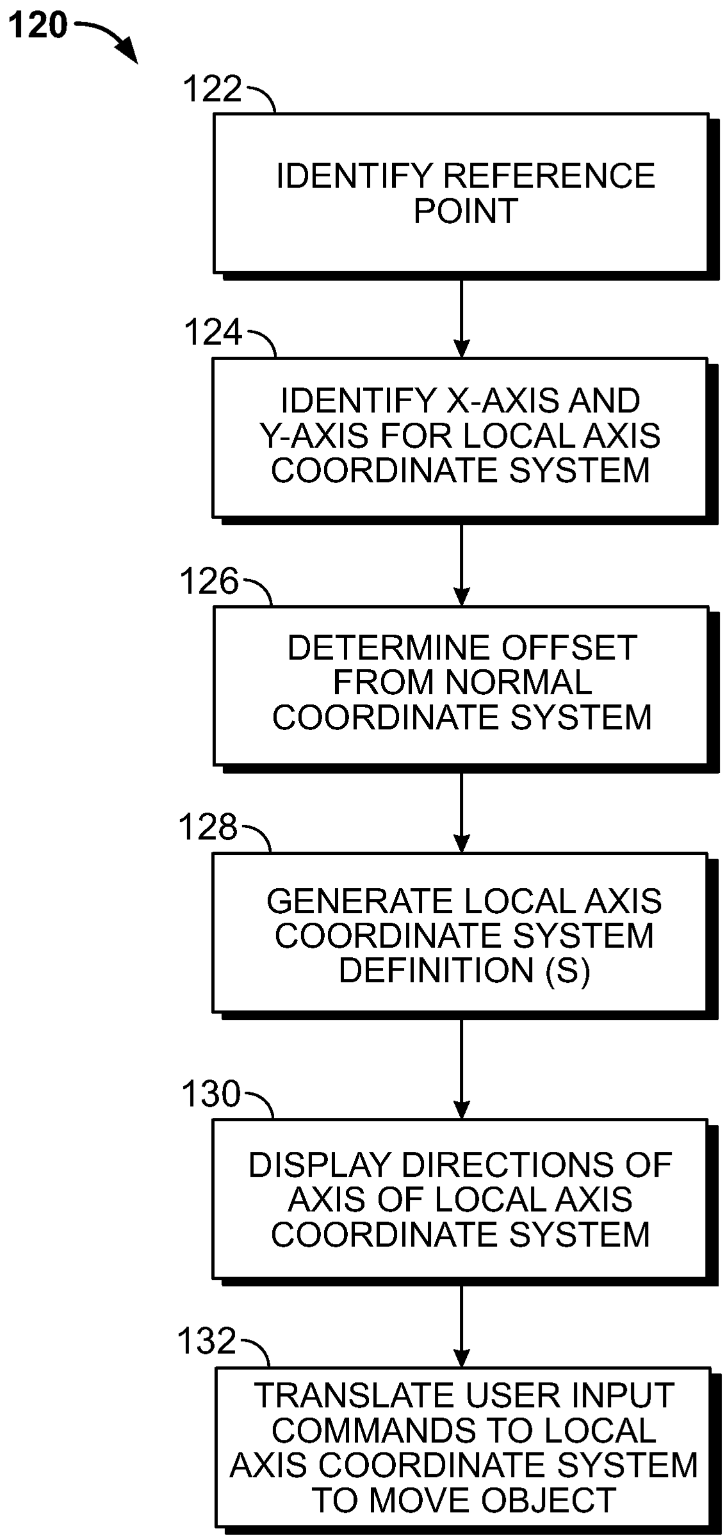
FIG. 10 is an illustration of a process for defining custom axes and controlling a gantry crane in accordance with various embodiments.

One method 120 for performing various embodiments is illustrated in FIG. 10. The method includes identifying a reference point at 122 for the new axes, such as will be used to define the local axis coordinate system as described herein. For example, in one embodiment, the axes are centered by lowering the hoist hook 92 (shown in FIG. 7) to the desired location and then choosing that location as the "new" center reference point. This location, which may be determined based on the known location of the X-axis and Y-axis drive motors 52, 54 then may be stored in memory, for example, the memory 60 of the controller 50 (shown in FIG. 2).

The X-axis and Y-axis for the local axis coordinate system are then identified at 124, for example, as described in more detail herein. For example, the hoist hook 92 may then be moved to the +X position and set (e.g., stored in the memory 60), followed by the −X, +Y, and −Y positions. For example, the +/−X-positions and +/−Y-positions may define the maximum travel position along each of the +/−X-axis and +/−Y-axis, or may define a portion of the axis, with the remainder extrapolated based on a known size of, for example, the hangar 22.

An offset from the normal coordinate system, for example, the hangar coordinate system, is then determined at 126. For example, once the positions described above in the initiation process are stored in memory 60, for example, a number of degrees of offset from the X-axis and Y-axis of the gantry carne 20 may be determined and stored in the memory 60. Thus, these offset values may be stored in a table to translate movements from a user input. For example, movement of a control or user input in an X-direction of the control is translated to the new local axis coordinate system X-direction. However, it should be appreciated that the translated movement may be for any direction of the controller based on the user input, such as when using a multi-directional controller (e.g., a multi-directional joystick).

Using the offset values, the local axis coordinate system is generated at 128, which may include different angle offsets for the different axes. Accordingly, a new coordinate system is created and all crane movements are then controlled/driven via a plurality of drive motors (e.g., the X-axis drive motors 52 and Y-axis drive motor 54) working in unison or concurrently to create smooth or fluid "off axis" or "new axis" movements. The directions of the axes of the local axis coordinate system may be displayed at 130 as described herein. For example, a visual display device, such as the display board 96 may display the new axis of motion to ensure the operator is cognizant of the new local (or custom) axis. A visual warning or notice also may be displayed, such as on a hand held controller unit that is used by the operator to move the crane. It should be noted that multiple coordinate systems may be stored in the controller 50 and used, or switched between as desired or need, with the axes display accordingly. The display board 96 on the gantry crane 20 may also display other information such as the load limit of the gantry crane 20, which may be transmitted directly to the controller/computer via a load cell in real time. Other information may be displayed, such as fault codes or preventative maintenance schedules. In some embodiments, gantry crane or aircraft information may be displayed. However, it should be appreciated that any information may be displayed or provided to the user. The display board 96 or other displays also may be linked, such as via an intranet to maintenance homepage or emails to provide notification of lifts that have exceeded the rated capacity, etc.

Thus, with the custom axes defined, such as the local axis coordinate system, user input commands are translated to the local axis coordinate system to move the object at 132. For example, as described herein, forward and reverse directions may be translated to correspond to the axes offset from the normal axes (e.g., axes of the hangar coordinate axes).

It should be noted that the various embodiments or portions thereof, such as the systems described herein be implemented in hardware, software or a combination thereof. The various embodiments and/or components also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. An overhead gantry crane comprising:

a X-axis drive motor;

a Y-axis drive motor;

a hoist member operable to be moved into a plurality of positions by the X-axis drive motor and the Y-axis drive motor to move an object; and a controller operable to control operation of the X-axis motor and the Y-axis motor, the controller further operable to define a local axis coordinate system for the overhead gantry crane based on a reference point determined from an X-axis location and Y-axis location of the hoist member and a desired movement path for the object, and cause movement of the object by concurrently controlling the X-axis motor and the Y-axis motor using the local axis coordinate system, wherein the local axis coordinate system is offset relative to an X-axis and a Y-axis of the overhead gantry crane;

wherein the local axis coordinate system aligns with a longitudinal axis and a lateral axis of the object, wherein the object is offset with respect to the X-axis and the Y-axis of the overhead gantry crane and an absolute coordinate axis of a structure in which the object is located.

2. The overhead gantry crane of claim 1, further comprising a display coupled to the hoist member, the display operable to display an X-axis and a Y-axis of the local axis coordinate system and the X-axis and the Y-axis of the overhead gantry crane.

3. The overhead gantry crane of claim 1, further comprising a display coupled to the hoist member, the display comprising a light emitting diode (LED) display board having an opening for receiving therethrough cables of the hoist member.

4. The overhead gantry crane of claim 1, further comprising a display coupled to the hoist member, the display operable to display gantry crane and aircraft information.

5. The overhead gantry crane of claim 1, wherein the controller comprises a memory for storing a plurality of local axis coordinate systems aligned with one or more objects to be moved by the overhead gantry crane, the plurality of local axis coordinate systems selectable by a user.

6. The overhead gantry crane of claim 1, wherein a first axis of the local axis coordinate system is parallel to a longitudinal axis of the object to be moved, and wherein a second axis of the local axis coordinate system is perpendicular to the first axis and parallel to a lateral axis of the object to be moved, wherein the lateral axis is perpendicular to the longitudinal axis.

7. The overhead gantry crane of claim 1, wherein the controller comprises a memory to store a local axis coordinate system definition corresponding to the local axis coordinate system to translate movements from a user input to the axes of the local axis coordinate system.

8. The overhead gantry crane of claim 1, further comprising beams supporting the X-axis motor and the Y-axis motor, at least some of the beams coupled to an aircraft hangar and wherein the object to be moved is at least a portion of an aircraft.

9. The overhead gantry crane of claim 1, wherein the object to be moved is in an offset position relative to the X-axis and the Y-axis of the gantry crane.

10. A method for moving an object using an overhead gantry crane, the method comprising:

storing in a memory, as a reference point, a position of a hoist member of the overhead gantry crane moved for attachment to the object to be moved using X-axis and Y-axis drive motors;

defining a local axis coordinate system for the overhead gantry crane for a controller to control the movement of the object based on the reference point and a desired movement path for the object, wherein the local axis coordinate system is offset relative to an X-axis and a Y-axis of the overhead gantry crane; and using the defined local axis coordinate system to control movement of the object along the desired movement path by concurrently controlling with the controller the X-axis and Y-axis drive motors;

wherein the local axis coordinate system aligns with a longitudinal axis and a lateral axis of the object, wherein the object is offset with respect to the X-axis and the Y-axis of the overhead gantry crane and an absolute coordinate axis of a structure in which the object is located.

11. The method of claim 10, further comprising:

displaying an X-axis and a Y-axis of the local axis coordinate system; and displaying the X-axis and the Y-axis of the overhead gantry crane.

12. The method of claim 10, further comprising displaying gantry crane and aircraft information.

13. The method of claim 10, further comprising storing a plurality of local axis coordinate systems aligned with one or more objects to be moved by the overhead gantry crane, the plurality of local axis coordinate systems selectable by a user.

14. The method of claim 10, wherein defining the local axis coordinate system comprises defining a coordinate system having a first axis parallel to a longitudinal axis of the object to be moved and a second axis that is perpendicular to the first axis and parallel to a lateral axis of the object to be moved, wherein the lateral axis is perpendicular to the longitudinal axis.

15. The method of claim 10, further comprising storing a local axis coordinate system definition corresponding to the local axis coordinate system and translating movements from a user input to the axes of the local axis coordinate system.

16. A non-transitory computer readable medium programmed to instruct a computer to:

store, as a reference point, a position of a hoist member of an overhead gantry crane moved for attachment to an object to be moved using X-axis and Y-axis drive motors;

define a local axis coordinate system for the overhead gantry crane to control the movement of the object based on the reference point and a desired movement path for the object, wherein the local axis coordinate system is offset relative to an X-axis and a Y-axis of the overhead gantry crane; and use the defined local axis coordinate system to control movement of the object along the desired movement path by concurrently controlling with the controller the X-axis and Y-axis drive motors;

wherein the local axis coordinate system aligns with a longitudinal axis and a lateral axis of the object, wherein the object is offset with respect to the X-axis and the Y-axis of the overhead gantry crane and an absolute coordinate axis of a structure in which the object is located.

17. The non-transitory computer readable medium of claim 16 further programmed to instruct a computer to:

display an X-axis and a Y-axis of the local axis coordinate system and the X-axis and the Y-axis of the overhead gantry crane.

18. The non-transitory computer readable medium of claim 16 further programmed to instruct a computer to:

define the local axis coordinate system by defining a coordinate system having a first axis parallel to a longitudinal axis of the object to be moved and a second axis that is perpendicular to the first axis and parallel to a lateral axis of the object to be moved, wherein the lateral axis is perpendicular to the longitudinal axis.

* * * * *